(12) United States Patent
Sun et al.

(10) Patent No.: US 12,301,165 B2
(45) Date of Patent: May 13, 2025

(54) ARRAY BACKTRACKING ANGLE ADJUSTING METHOD AND APPARATUS, AND STORAGE MEDIUM

(71) Applicant: TRINA SOLAR CO., LTD, Changzhou (CN)

(72) Inventors: Kai Sun, Changzhou (CN); Ming Zhao, Changzhou (CN); Jifan Gao, Changzhou (CN); Peng Quan, Changzhou (CN); Guokun Huang, Changzhou (CN)

(73) Assignee: TRINA SOLAR CO., LTD, Changzhou (CN)

( * ) Notice: Subject to any disclaimer, the term of this patent is extended or adjusted under 35 U.S.C. 154(b) by 0 days.

(21) Appl. No.: 18/289,048

(22) PCT Filed: Oct. 25, 2022

(86) PCT No.: PCT/CN2022/127189
§ 371 (c)(1),
(2) Date: Oct. 31, 2023

(87) PCT Pub. No.: WO2023/072012
PCT Pub. Date: May 4, 2023

(65) Prior Publication Data
US 2024/0223123 A1 Jul. 4, 2024

(30) Foreign Application Priority Data
Oct. 25, 2021 (CN) .......................... 202111238734.X

(51) Int. Cl.
*H02S 20/32* (2014.01)
*H02J 3/38* (2006.01)

(52) U.S. Cl.
CPC .............. *H02S 20/32* (2014.12); *H02J 3/381* (2013.01); *H02J 2300/24* (2020.01)

(58) Field of Classification Search
CPC ....... H02S 20/32; H02J 3/381; H02J 2300/24; G05D 3/105; G06T 7/246; G06T 7/292; Y02E 10/50
See application file for complete search history.

(56) References Cited

U.S. PATENT DOCUMENTS

| 11,108,353 B1 | 8/2021 | Morse et al. |
| 2010/0051086 A1 | 3/2010 | Keshner et al. |

(Continued)

FOREIGN PATENT DOCUMENTS

| CN | 106933255 A | * | 7/2017 | ............... G05D 3/12 |
| CN | 110658858 A | * | 1/2020 | ............... G05D 3/12 |

(Continued)

OTHER PUBLICATIONS

Australian Patent Office, Examination Report No. 1 issued in corresponding Application No. 2022378129, 1 dated May 21, 2024, 6 pp.

(Continued)

*Primary Examiner* — Charles Cai
(74) *Attorney, Agent, or Firm* — Taft Stettinius & Hollister LLP

(57) ABSTRACT

Disclosed in the present application are an array backtracking angle adjusting method and apparatus, and a storage medium. The method comprises: acquiring an initial backtracking angle group of a horizontal single-axis tracker, the initial backtracking angle group comprising initial backtracking angles of a plurality of arrays of the horizontal single-axis tracker; according to a preset deviation angle, adjusting the initial backtracking angle group to determine a plurality of candidate backtracking angle groups, the plurality of candidate backtracking angle groups comprising adjusted backtracking angles of the plurality of arrays; and, on the basis of the degree of dispersion of the adjusted backtracking angles of the plurality of arrays in each can- (Continued)

didate backtracking angle group, determining a target backtracking angle group from the plurality of candidate backtracking angle groups, the target backtracking angle group comprising target backtracking angles of the plurality of arrays.

13 Claims, 5 Drawing Sheets

(56) References Cited

U.S. PATENT DOCUMENTS

2013/0098445 A1 4/2013 Lee et al.
2023/0198459 A1* 6/2023 Morse .................. G01S 3/7862
                                                                700/306

FOREIGN PATENT DOCUMENTS

| CN | 113093813 A   | 7/2021 |
| WO | 2019084454 A1 | 5/2019 |
| WO | 2021067828 A1 | 4/2021 |

OTHER PUBLICATIONS

International Search Report for corresponding Application No. PCT/CN2022/127189 dated Jan. 9, 2023, 4 pages.
Written Opinion for corresponding Application No. PCT/CN2022/127189 dated Jan. 9, 2023, 3 pages.

* cited by examiner

ARRAY BACKTRACKING ANGLE ADJUSTING METHOD AND APPARATUS, AND STORAGE MEDIUM

CROSS-REFERENCE TO RELATED APPLICATIONS

This application is a national stage of International Application No. PCT/CN2022/127189 filed on Oct. 25, 2022, which claims priority to Chinese Patent Applications No. 202111238734.X, filed on Oct. 25, 2021. The entire contents of the above applications are incorporated herein in their entireties.

TECHNICAL FIELD

The embodiments of the present disclosure relate to the technical field of photovoltaic power generation, for example, to an array backtracking angle adjusting method and apparatus, and a storage medium.

BACKGROUND

Solar photovoltaic power generation has been widely used due to its advantages of cleanliness, safety and convenience. At present, a photovoltaic mounting bracket mainly includes a fixed bracket, a horizontal single-axis tracker, an oblique single-axis tracker and a dual-axis tracker. The structure of the horizontal single-axis tracker is simple and practical, and the power generation gain is obvious, therefore the photovoltaic mounting bracket mostly adopts the horizontal single-axis tracker.

In the related art, the tracking algorithm of the horizontal single-axis tracker generally adopts an backtracking algorithm when the solar elevation angle is low in the morning and evening. The conventional backtracking algorithm is mainly applied to a scene where the horizontal single-axis tracker is located on flat ground. But in actual engineering, the horizontal single-axis tracker is mostly deployed on uneven terrain, such as mountain projects, and there are mounting errors during construction, which will cause relative slopes between arrays. In order to solve shading between the arrays caused by the relative slopes, backtracking angles between the arrays of the horizontal single-axis tracker can be adjusted.

However, due to a close correlation between the backtracking angles of adjacent array brackets, after adjusting the backtracking angles between the arrays of the horizontal single-axis tracker based on the adjustment method in the related art, a great difference exists between the backtracking angles of the front and rear rows of the arrays. If backtracking is performed based on the backtracking angles with such great differences, a global output power of the entirety of arrays will be affected.

SUMMARY

The present disclosure provides an array backtracking angle adjusting method and apparatus, and a storage medium. By adjusting an initial backtracking angle group, a target backtracking angle group with a small degree of dispersion can be obtained, thereby improving the global output power of the entire array.

In a first aspect, the present disclosure provides an array backtracking angle adjusting method. The method includes: acquiring an initial backtracking angle group of a horizontal single-axis tracker; the initial backtracking angle group including initial backtracking angles of a plurality of arrays of the horizontal single-axis tracker; adjusting, according to a preset deviation angle, the initial backtracking angle group, to determine a plurality of candidate backtracking angle groups; the plurality of candidate backtracking angle groups including adjusted backtracking angles of the plurality of arrays; and determining, according to a degree of dispersion of the adjusted backtracking angles of the plurality of arrays in each of the candidate backtracking angle groups, a target backtracking angle group from the plurality of candidate backtracking angle groups; the target backtracking angle group including target backtracking angles of the plurality of arrays.

In a second aspect, the present disclosure provides an array backtracking angle adjusting apparatus. The apparatus includes an acquisition module, an adjustment module, and a determination module.

The acquisition module is configured to acquire an initial backtracking angle group of a horizontal single-axis tracker. The initial backtracking angle group includes initial backtracking angles of a plurality of arrays of the horizontal single-axis tracker. The adjustment module is configured to adjust, according to a preset deviation angle, the initial backtracking angle group to determine a plurality of candidate backtracking angle groups. Each of the candidate backtracking angle groups includes adjusted backtracking angles or initial backtracking angles of the plurality of arrays. The determination module is configured to determine, according to a degree of dispersion of the adjusted backtracking angles of the plurality of arrays in each of the candidate backtracking angle groups, a target backtracking angle group from the plurality of candidate backtracking angle groups. The target backtracking angle group includes target backtracking angles of each of the arrays.

In a third aspect, the present disclosure provides an array backtracking angle adjusting apparatus. The apparatus includes a memory, a processor, a bus and a communication interface. The memory is configured to store computer-executable instructions. The processor is connected to the memory through the bus. When the array backtracking angle adjusting apparatus is running, the processor executes the computer-executed instructions stored on the memory to cause the array backtracking angle adjusting apparatus to perform the array backtracking angle adjusting method provided by the first aspect.

In a fourth aspect, the present disclosure provides a computer-readable storage medium. The computer-readable storage medium has instructions stored thereon. A computer, when executing the instructions, performs the array backtracking angle adjusting method provided by the first aspect.

In a fifth aspect, the present disclosure provides a computer program product. The computer program product includes computer instructions. The computer instructions, when run on a computer, cause the computer to perform the array backtracking angle adjusting method provided by the first aspect.

It should be noted that all or part of the above computer instructions may be stored on the computer-readable storage medium. The computer-readable storage medium may be packaged together with the processor of the array backtracking angle adjusting apparatus, or may be packaged separately from the processor of the array backtracking angle adjusting apparatus, which is not limited thereto in the present disclosure.

DETAILED DESCRIPTION OF THE EMBODIMENTS

Figure 1:
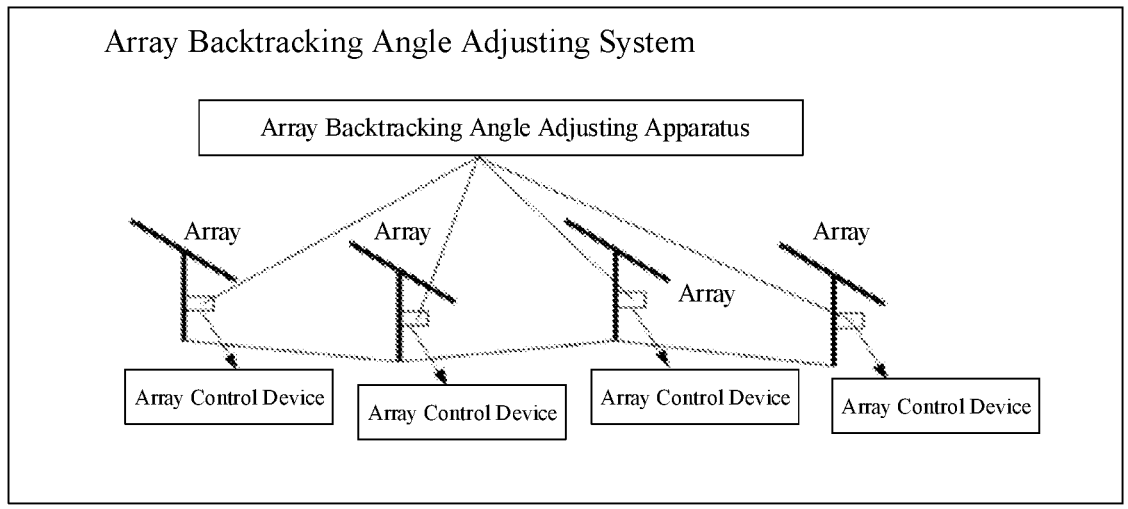
FIG. 1 is a schematic diagram illustrating an architecture of an array backtracking angle adjusting system according to an embodiment of the present disclosure.

An array backtracking angle adjusting method and apparatus, and a storage medium according to embodiments of the present disclosure will be described in detail below with reference to the accompanying drawings.

The term "and/or" as used herein is simply an association relationship describing associated objects, indicating that three types of relationships can exist, for example, A and/or B, which can mean: A alone, both A and B, and B alone.

The terms "first" and "second" in the specification and drawings of the present disclosure are used to distinguish different objects, or to distinguish different processes for the same object, rather than to describe a specific sequence of objects.

In addition, the terms "including" and "having" mentioned in the description of the present disclosure and any variations thereof are intended to cover non-exclusive inclusion. For example, a process, method, system, product or device including a series of steps or units is not limited to the listed steps or units, but optionally also includes other unlisted steps or units, or optionally also includes other steps or units inherent to the process, method, product or device.

It should be noted that, in the embodiments of the present disclosure, words such as "exemplary" or "for example" are used as examples, illustrations or descriptions. Any embodiment or design scheme described as "exemplary" or "for example" in the embodiments of the present disclosure shall not be interpreted as being more preferred or more advantageous than other embodiments or design schemes. Rather, use of words such as "exemplary" or "for example" is intended to present related concepts.

In the description of the present disclosure, unless otherwise indicated, "plurality" means at least two.

In the related art, the tracking algorithm of a horizontal single-axis tracker generally adopts an backtracking algorithm when the solar elevation angle is low in the morning and evening, and an backtracking angle of each array can be calculated according to the parameters such as pitch between arrays and a light incident angle, so as to ensure that there is no shading between the arrays. However, the conventional backtracking algorithm is mainly applied to a scene where the horizontal single-axis tracker is located on flat ground, but in actual engineering, the horizontal single-axis tracker is mostly deployed on uneven terrain, such as mountain projects, etc., and there are mounting errors during construction, which will cause relative slopes between the arrays. If the horizontal single-axis tracker still rotates according to the conventional backtracking algorithm, the shading will be occurred between the arrays, resulting in loss of power generation, and there will also be light leakage, resulting in insufficient utilization of solar energy. Furthermore, due to a close correlation between the backtracking angles of adjacent array brackets, if the backtracking angles between the arrays of the horizontal single-axis tracker are adjusted in order to reduce the shading, a global output power of the entirety of the arrays will be affected when the backtracking angles between the arrays differ greatly.

In view of the problems existing in the above-mentioned related art, an embodiment of the present disclosure provides an array backtracking angle adjusting method. Based on this method, according to a degree of dispersion of adjusted backtracking angles of a plurality of arrays, a target backtracking angle group with a smaller degree of dispersion of the adjusted backtracking angles of the plurality of arrays can be determined. Compared with the backtracking based on an initial backtracking angle group, the backtracking based on the target backtracking angle group acquired by the present disclosure can improve the global output power of the entirety of the arrays.

The array backtracking angle adjusting method according to the embodiment of the present disclosure may be applied to an array backtracking angle adjusting system shown in FIG. 1. With reference to FIG. 1, the array backtracking angle adjusting system may include an array backtracking angle adjusting apparatus, and a plurality of array control devices. As shown in FIG. 1, each of the arrays can be provided with an array control device, and the array backtracking angle adjusting apparatus is connected to each of the array control devices.

The array backtracking angle adjusting apparatus may be a physical machine, such as a server, or may be a virtual machine (VM) deployed on a physical machine. The array control device may be a controller provided on each of the arrays of the horizontal single-axis tracker.

Exemplarily, the array control device is configured to control the backtracking angle of the array. The array backtracking angle adjusting apparatus is configured to determine an adjusted target backtracking angle group, and then send a target backtracking angle corresponding to each of the arrays to the array control device provided on the corresponding array. Each of the array control devices can control and adjust the backtracking angle of a current array according to a received target backtracking angle of the current array.

The array backtracking angle adjusting method according to the present disclosure will be described below with reference to the array backtracking angle adjusting system shown in FIG. 1. The array backtracking angle adjusting method can be executed by the array backtracking angle adjusting apparatus in the array backtracking angle adjusting system shown in FIG. 1.

Figure 2:
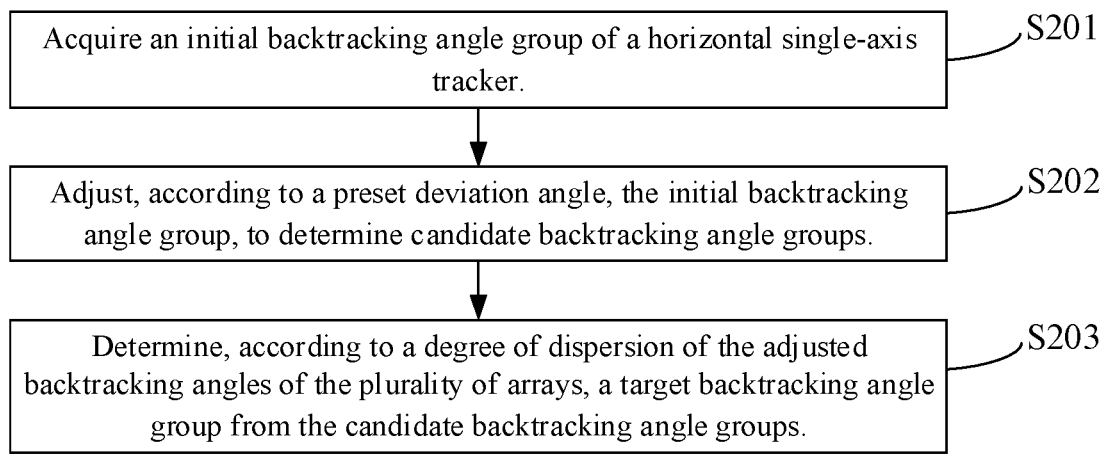
FIG. 2 is a flow diagram illustrating an array backtracking angle adjusting method according to an embodiment of the present disclosure.

Referring to FIG. 2, the array backtracking angle adjusting method according to the embodiment of the present disclosure includes steps S201 to S203.

In the step S201, an initial backtracking angle group of the horizontal single-axis tracker is acquired.

The initial backtracking angle group includes initial backtracking angles of the plurality of arrays of the horizontal single-axis tracker.

Figure 3:
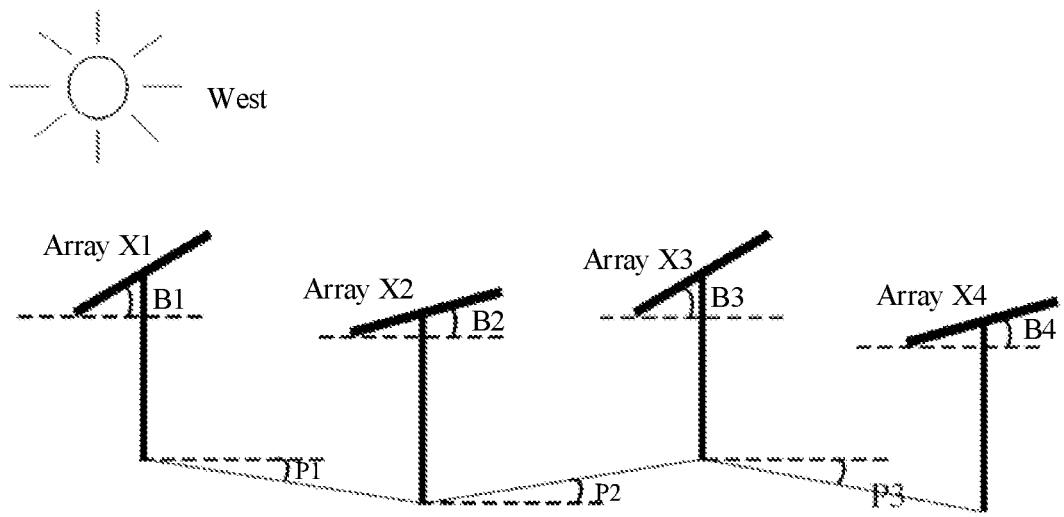
FIG. 3 is a schematic diagram illustrating an arrangement of arrays of a horizontal single-axis tracker according to an embodiment of the present disclosure.

Exemplarily, referring to FIG. 3, a schematic diagram illustrating an arrangement of the arrays of the horizontal single-axis tracker is provided. As shown in FIG. 3, the horizontal single-axis tracker includes four arrays. Due to the unevenness of the terrain and a height difference when the tracker is mounted, there are height differences between the four arrays. In order to reduce the shading between the arrays caused by the height differences, different initial backtracking angles can be determined for the four arrays to obtain the initial backtracking angle group. As shown in FIG. 3, the initial backtracking angles B1, B2, B3, and B4 of the four arrays are 20.2°, 11.29°, 34.18°, and 3.08°, respectively (in the implementation of the present disclosure, the initial backtracking angle defaults to have a positive value when the array is facing west), i.e., the initial backtracking angle group can be denoted as [20.2°, 11.29°, 34.18°, 3.08°], where B1, B2, B3, and B4 are the included angles formed by the four arrays and a horizontal plane respectively. It can be seen that there are great differences between the four angles of B1, B2, B3, and B4 in FIG. 3. When the backtracking is performed according to such an initial backtracking angle group, the mismatch loss of the maximum power point tracking (MPPT) of an inverter would be relatively large, which will affect the global output power of the entirety of the arrays. Therefore, in the embodiment of the present disclosure, the initial backtracking angle group can be adjusted to improve the global output power of the entirety of the arrays.

Optionally, in a possible implementation, a relative slope parameter group of the horizontal single-axis tracker can be acquired first, and the initial backtracking angle group of the horizontal single-axis tracker is determined according to the relative slope parameter group. In response to determining that relative slope parameters in the relative slope parameter group are all less than or equal to a preset relative slope parameter, the initial backtracking angle group is adjusted according to a preset deviation angle to determine a candidate backtracking angle group.

The relative slope parameter group includes the relative slope parameter of each of the arrays of the horizontal single-axis tracker, and the relative slope parameter is configured to represent a relative height difference between two adjacent arrays. Exemplarily, as shown in FIG. 3, the relative slope angle P1 can be used to represent the relative height difference between the array X1 and the array X2, the relative slope angle P2 can be used to represent the relative height difference between the array X2 and the array X3, and the relative slope angle P3 can be used to represent the relative height difference between the array X3 and the array X4. Taking the relative slope angle P1 as an example, P1 is an included angle formed by a connection line connecting the bottom ends of the array X1 and the array X2 and the horizontal plane.

It can be understood that, in practical applications, the relative slope parameter may also be other parameters, which is not limited thereto in the embodiments of the present disclosure. For example, the relative slope parameter may also be a height difference between two adjacent arrays. In the following description of the embodiments of the present disclosure, the relative slope parameter being the relative slope angle will be described in detail as an example.

Optionally, in a possible implementation, the initial backtracking angle group may be determined according to an initial array inclination angle, the pitch between the arrays, a width of the array, a light incident angle at a current moment and the relative slope parameter group. Each of the arrays may include a plurality of modules.

Figure 4:
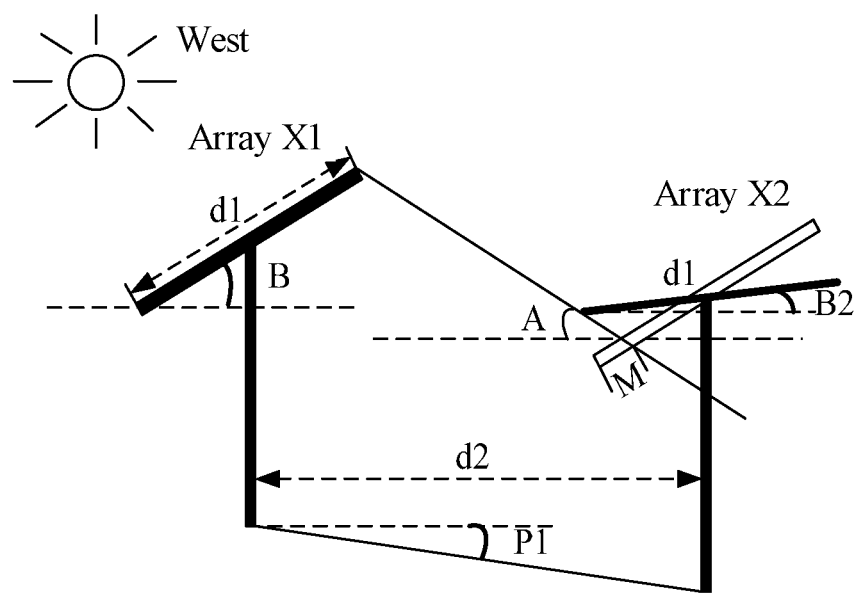
FIG. 4 is a schematic diagram illustrating an arrangement of a part of arrays of a horizontal single-axis tracker according to an embodiment of the present disclosure.

Exemplarily, FIG. 4 provides a schematic diagram illustrating an arrangement of a part of the arrays of the horizontal single-axis tracker. The array X1 and the array X2 in FIG. 4 may be the array X1 and the array X2 in FIG. 3. As shown in FIG. 4, at this time, the sunlight incidents from the west side, the included angle A formed by the cast shadow of the sunlight on a plane perpendicular to an axial direction and the horizontal plane is the light incident angle at a current moment, the initial included angle formed by the array X1 and the horizontal plane and the initial included angle formed by the array X2 and the horizontal plane are both the initial array inclination angle B, the pitch between the array X1 and the array X2 is d2, the widths of the array X1 and the array X2 are both d1, and the relative slope angle between the array X1 and the array X2 is P1. It can be seen from FIG. 4 that due to the existence of the relative slope angle P1, the array X1 will shade the array X2 at the current moment, forming a shadow part M on the array X2. In order to avoid an effect of the shading on the output power of the array, the initial array inclination angle B of the array X2 can be adjusted. As shown in FIG. 4, when the initial array inclination angle B of the array X2 is adjusted to the array inclination angle B2, the array X1 will not shade the array X2. Exemplarily, the array inclination angle B2 can be determined according to the expression (1):

$$d2 = (d1*\cos B)/2 + \qquad(1)$$
$$(d1*\cos B2)/2 + \left[(d1*\sin B)/2 + (d1*\sin B2)/2 + \tan P1*d2\right]/\tan A$$

Similarly, the array inclination angle B3 of the array X3 in FIG. 3 can be determined based on the array inclination angle B2 of the array X2, and the array inclination angle B4 of the array X4 in FIG. 3 can be determined based on the array inclination angle B3 of the array X3, and B1 (equal to B), B2, B3 and B4 are determined as the initial backtracking angle group.

In the step S202, the initial backtracking angle group is adjusted according to a preset deviation angle to determine a plurality of candidate backtracking angle groups.

Each of the candidate backtracking angle groups includes adjusted backtracking angles of the plurality of arrays. The preset deviation angle may be an angle determined by a person in advance, for example, the preset deviation angle may be 1°.

Optionally, the initial backtracking angle of a first row of the arrays in the initial backtracking angle group is continuously increased by the preset deviation angle for F times to acquire F adjusted backtracking angles of the first row of the arrays. The first row of the arrays mentioned here refers to the array closest to the light source, as shown in FIG. 3, the array X1 is the first row of the arrays. Meanwhile, the initial backtracking angle of the first row of the arrays in the initial backtracking angle group is continuously decreased by the preset deviation angle for G times to acquire G adjusted backtracking angles of the first row of the arrays. F and G are both positive integers. F adjusted backtracking angle groups are determined according to the F adjusted backtracking angles of the first row of the arrays and the relative slope parameter group, and G adjusted backtracking angle groups are determined according to the G adjusted backtracking angles of the first row of the arrays and the relative slope parameter group. Then the F adjusted backtracking angle groups, the G adjusted backtracking angle groups and the initial backtracking angle group are determined as the plurality of candidate backtracking angle groups.

Exemplarily, as shown in FIG. 3 and FIG. 4, if the initial backtracking angle group consisting of B1, B2, B3 and B4 is [20.2°, 11.29°, 34.18°, 3.08°], F is 1, G is 14, the relative slope parameter group is [1.9°, −0.6°, 1.3°], the light incident angle A at the current moment is 17°, the array width d1 is 4400 mm, and the pitch d2 between the arrays is 9000 mm. The initial backtracking angle of the first row of the arrays in the initial backtracking angle group is increased by the preset deviation angle for 1 time to acquire the adjusted backtracking angle of 21.2° of the first row of arrays. The initial backtracking angle of the first row of the arrays in the initial backtracking angle group is continuously decreased by the preset deviation angle for 14 times to acquire fourteen adjusted backtracking angles of the first row of the arrays, which are respectively as follows: 19.2°, 18.2°, 17.2°, 16.2°, 15.2°, 14.2°, 13.2°, 12.2°, 11.2°, 10.2°, 9.2°, 8.2°, 7.2°, and 6.2°. Referring to the expression (1), and according to the adjusted backtracking angle acquired by increasing the initial backtracking angle of the first row of the arrays for 1 time, one adjusted backtracking angle group can be determined as [21.2°, 10.39°, 35.46°, 2.25°], and according to the adjusted backtracking angles acquired by continuously decreasing the initial backtracking angle of the first row of the arrays for 14 times, fourteen adjusted backtracking angle groups can be determined as [19.2°, 12.2°, 32.91°, 3.94°], [18.2°, 13.13°, 31.66°, 4.81°], [17.2°, 14.09°, 30.43°, 5.7°], [16.2°, 15.07°, 29.21°, 6.6°], [15.2°, 16.06°, 28.01°, 7.52°], [14.2°, 17.09°, 26.81°, 8.46°], [13.2°, 18.13°, 25.63°, 9.41°], [12.2°, 19.2°, 24.46°, 10.39°], [11.2°, 20.30°, 23.30°, 11.38°], [10.2°, 21.42°, 22.14°, 12.39°], [9.2°, 22.57°, 21.00°, 13.42°], [8.2°, 23.75°, 19.86°, 14.47°], [7.2°, 24.97°, 18.73°, 15.54°], and [6.2°, 26.21°, 17.61°, 16.64°], respectively. The sixteen backtracking angle groups consisting of the one adjusted backtracking angle group, the fourteen adjusted backtracking angle groups acquired above and the initial backtracking angle group can be determined as the candidate backtracking angle groups.

It can be seen from the above determination method of the initial backtracking angle group that, the relative slope parameter between two adjacent arrays will affect the initial backtracking angle of the rear array. Therefore, when adjusting the initial backtracking angle group according to the preset deviation angle, if the relative slope parameter between the two adjacent arrays is too large, an adjustment degree of the initial backtracking angle of the rear array may be particularly large in order to keep the front array from shading the rear array, so the backtracking angle of the rear array needs to be adjusted to an extremely low value, and even the rear array is adjusted to be parallel to the horizontal plane or the backtracking angle of the rear array is adjusted to a negative value. In this way, although there is no shading, the power generation loss caused by the angle reduction will be greater than the power generation loss caused by shading. Therefore, in the embodiment of the present disclosure, the initial backtracking angle group is adjusted only when it is determined that the relative slope parameters in the relative slope parameter group are all less than or equal to the preset relative slope parameter.

The preset relative slope parameter may be a parameter determined by a person in advance. For example, the preset relative slope parameter may be 3°.

Optionally, when it is determined that there is a relative slope parameter in the relative slope parameter group being greater than the preset relative slope parameter, the plurality of arrays can be grouped into array groups according to the relative slope parameters of the plurality of arrays, and an initial backtracking angle sub-group corresponding to each of the array groups is determined. In each of the array groups, an initial backtracking angle sub-group corresponding to a current array group is adjusted according to the preset deviation angle to determine a plurality of candidate backtracking angle sub-groups. Each of the candidate backtracking angle sub-groups includes adjusted backtracking angles of the arrays in the current array group. In each of the array groups, a target backtracking angle sub-group is determined from the plurality of candidate backtracking angle sub-groups according to the adjusted backtracking angles of the arrays in the current array group. The target backtracking angle sub-group includes target backtracking angles of the arrays in the current array group.

Figure 5:
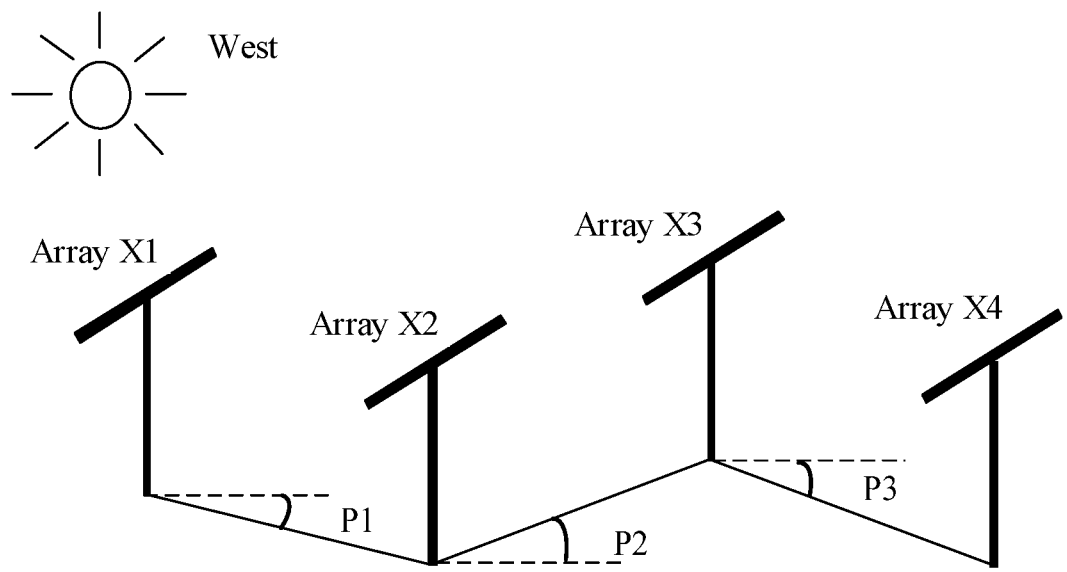
FIG. 5 is a schematic diagram illustrating another arrangement of arrays of a horizontal single-axis tracker according to an embodiment of the present disclosure.

Exemplarily, referring to FIG. 5, a schematic diagram illustrating another arrangement of the arrays of the horizontal single-axis tracker is provided. As shown in FIG. 5, the horizontal single-axis tracker includes four arrays X1, X2, X3 and X4, and the corresponding relative slope parameter group is [3.8°, −4.4°, 4.4°]. It can be seen that there are relative slope parameters in the relative slope parameter group that are greater than the preset relative slope parameter of 3°, so the arrays need to be grouped.

Since the relative slope angle P2 between the array X2 and the array X3 is a negative value, i.e., the array X2 is lower than the array X3, the array X2 will not shade the array X3 when the sunlight is incident in a direction shown in FIG. 5. Therefore, optionally, in a possible implementation, the arrays can be grouped by using the array X3 as a boundary, i.e., the array X2 and the array X1 are determined as a group, and the array X3 and the array X4 are determined as a group. The array X2 and the array X1 are regarded as a new horizontal single-axis tracker to adjust the backtracking angle, and the array X3 and the array X4 are regarded as a new horizontal single-axis tracker to adjust the backtracking angle.

Optionally, the relative slope parameter group can be determined according to current time information by calling an inter-array relative slope model. The inter-array relative slope model is calculated according to light incident angles in different historical time periods, the initial array inclination angle, the pitch between the arrays, the width of the array, and a shading parameter of each of the arrays.

It can be understood that, in different time periods, the incident directions of the sunlight are different, and the shadows of shading of the front array to the rear array are also different, so there may be different relative slope parameter groups corresponding to the different time periods. When there is a need to adjust the backtracking angles of the arrays of the horizontal single-axis tracker, the current time information can be acquired, and the corresponding time period (for example, morning in spring) can be determined according to the current time information. The inter-array relative slope model can determine a relative slope parameter group based on a time period, so the current time information can be input into the inter-array relative slope model to determine the relative slope parameter group.

Exemplarily, as shown in FIG. 4, the relative slope angle P1 between the array X1 and the array X2 can be determined according to the light incident angle A at the current moment, the initial array inclination angle B, the width d1 of the array X1 and the array X2, the pitch d2 between the array X1 and the array X2, and a length of the shadow part M. Exemplarily, P1 can be determined according to expression (2):

$$\tan P1 = ((d2 - \cos B * (d1 - M)) * \tan A - \sin B * (d1 - M))/d2 \quad (2)$$

Optionally, in a possible implementation, the shading parameter of the current array can be determined according to a total length of shadow and a slope of the shadow on the current array.

Figure 6:
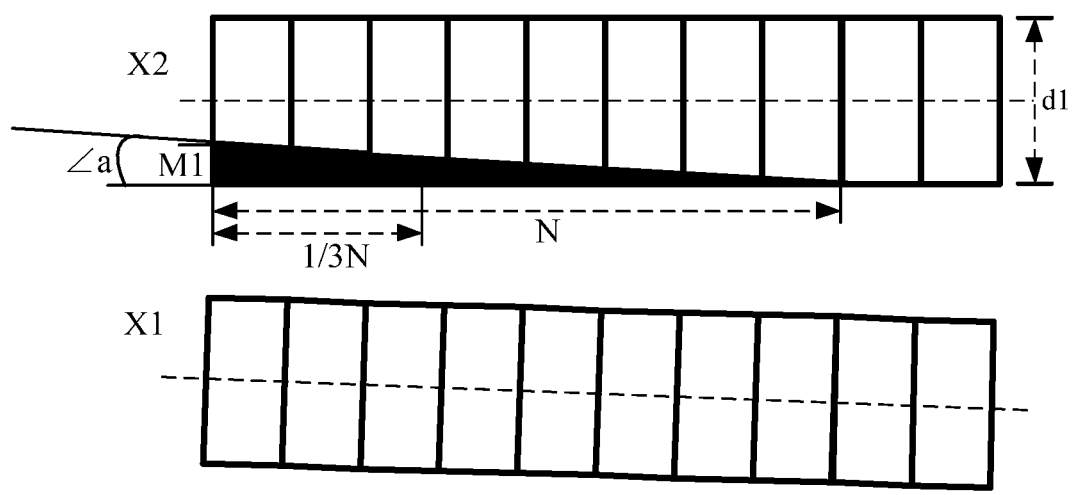
FIG. 6 is a top view illustrating an arrangement of a part of arrays of a horizontal single-axis tracker according to an embodiment of the present disclosure.

The total length of the shadow on the current array may be the total length of being shaded of modules of the array on a sunlight incident side, for example, as shown in FIG. 6, the total length of the shadow on the current array is denoted as N. The slope of the shadow can be the slope of the shadow observed from overlooking the current array, for example, as shown in FIG. 6, the slope of the shadow on the current array is denoted as $\tan \angle a$.

In practical applications, each of the arrays may include a plurality of modules. The relative height difference between each of the plurality of modules and the modules of the rear array may be different, so there will be a north-south height difference between the front array and the rear array, resulting in different shading of the front array to each module of the rear array.

Exemplarily, as shown in FIG. 6, a top view illustrating an arrangement of a part of the arrays of the horizontal single-axis tracker is provided. The array X1 is the front array, and the array X2 is the rear array. It can be seen that the plurality of modules of the array X2 are shaded differently by the array X1. Therefore, in the embodiment of the present disclosure, the shading parameter can be determined according to the total length of shadow and the slope of the shadow of the shading on the array X2. There are shadows on the eight modules on the left side of the array X2 in FIG. 6. The left-most module that is shaded has the largest shadow and the length of the shadow is M1, and the pitch length between the left-most module and the right-most module that is shaded is the total length N of the shadow of the current array, then the slope of the shadow (corresponding to $\tan \angle a$ in FIG. 6) of the current array can be determined according to M1 and N, and the shading parameter can be determined according to the magnitude of $\tan \angle a$. For example, when the value of $\tan \angle a$ is less than or equal to 0.02, the length of the shadow corresponding to ⅓N in FIG. 6 can be determined as the shading parameter. When the value of $\tan \angle a$ is greater than 0.02 and less than or equal to 0.05, the length of the shadow corresponding to ¼N in FIG. 6 can be determined as the shading parameter. When the value of $\tan \angle a$ is greater than 0.05, the length of the shadow corresponding to ⅕N in FIG. 6 can be determined as the shading parameter.

It can be understood that the above method of determining the shading parameter according to the total length of the shadow and the slope of the shadow on the current array is only an example, and does not constitute a limitation to the method of determining the shading parameter. In addition, the length of the shadow of each of the modules can be measured by a measuring tool such as a ruler, or an array image can be acquired by an acquisition device and then the length of the shadow of each of the modules can be determined according to the length of the shadow in the acquired array image and a pixel ratio. Alternatively, the length of the shadow can also be calculated according to a cell size and the number of shaded cells.

Optionally, in a possible implementation, the different historical time periods may include: a morning preset time period in spring, an afternoon preset time period in spring, a morning preset time period in summer, an afternoon preset time period in summer, a morning preset time period in autumn, an afternoon preset time period in autumn, a morning preset time period in winter, and an afternoon preset time period in winter.

Figure 7:
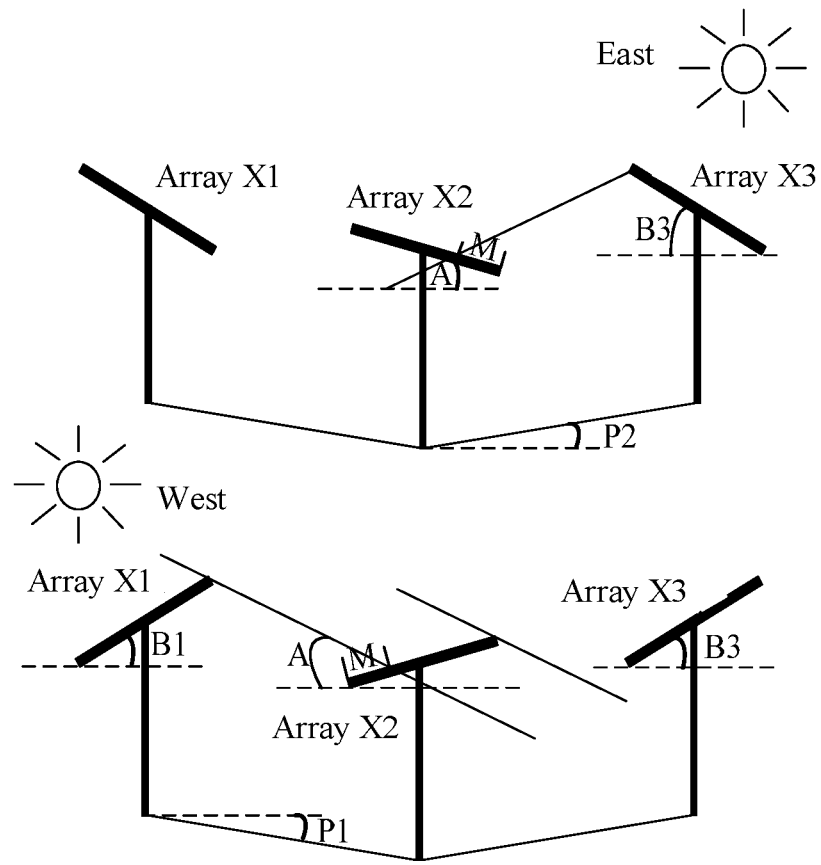
FIG. 7 is a schematic diagram illustrating an arrangement of arrays of one same horizontal single-axis tracker in different time periods according to an embodiment of the present disclosure.

Exemplarily, as shown in FIG. 7, a schematic diagram illustrating an arrangement of the arrays of one same horizontal single-axis tracker in the different time periods is provided. The upper schematic diagram in FIG. 7 is a schematic diagram illustrating the arrangement of the arrays in a morning time period, and the lower schematic diagram is a schematic diagram illustrating the arrangement of the arrays in an afternoon time period. It can be seen that in the morning time period, the shadow M formed on the array X2 is caused by the relative slope angle P2 between the array X2 and the array X3, while in the afternoon time period, the shadow M formed on the array X2 is caused by the relative slope angle P1 between the array X1 and the array X2. i.e., the relative slope angles in the morning time period and the afternoon time period may be different for the same array, resulting in different lengths of shadow. In addition, due to the north-south height difference between the front array and the rear array, the relative slope angles of the front array to the rear array in the morning time period and the afternoon time period are also different. Therefore, the shading parameters need to be determined respectively in the morning time period and the afternoon time period, and the relative slope parameter groups are determined respectively according to the shading parameters in the morning time period and the afternoon time period.

Figure 8:
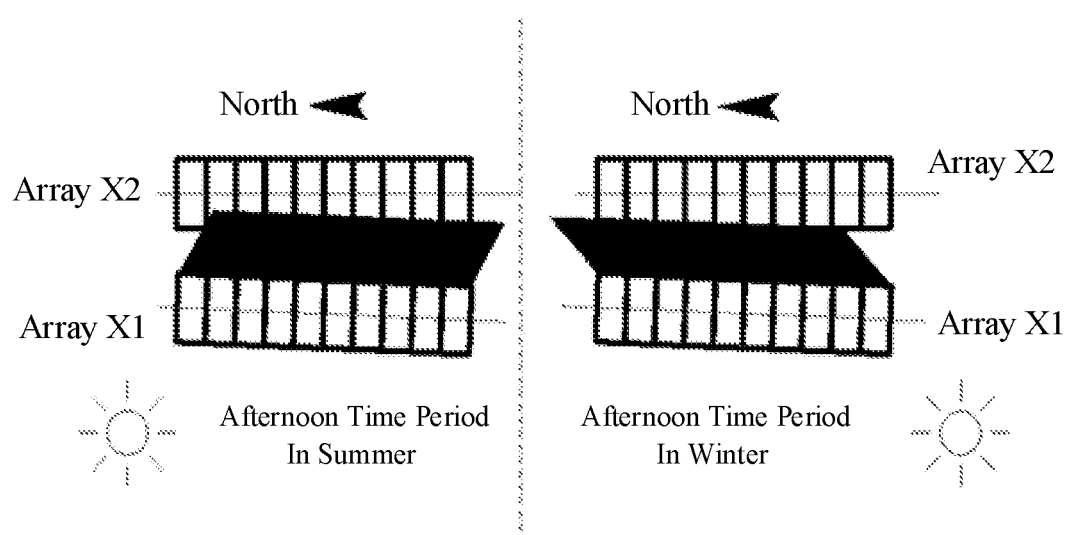
FIG. 8 is a schematic diagram illustrating an arrangement of arrays of one same horizontal single-axis tracker in different seasons according to an embodiment of the present disclosure.

Exemplarily, referring to FIG. 8, a schematic diagram illustrating an arrangement of the arrays of one same horizontal single-axis tracker in different seasons is provided. The schematic diagram on the left in FIG. 8 is a schematic diagram illustrating the arrangement of the arrays in an afternoon time period in the summer, and the schematic diagram on the right is a schematic diagram illustrating the arrangement of the arrays in the afternoon time period in the winter. As shown in FIG. 8, in the afternoon time period in the summer, the azimuth of the sun is north-west, and the shadow of the array is east-south, in the afternoon time period in the winter, the azimuth of the sun is south-west, and the shadow of the array is north-east, so the array X1 has different shadows on the array X2 in the two time periods. Therefore, the shading parameters also need to be determined respectively in different seasons, and the relative slope parameter groups are determined respectively according to the shading parameters.

In the step S203, according to a degree of dispersion of the adjusted backtracking angles of the plurality of arrays in each of the candidate backtracking angle groups, a target backtracking angle group is determined from the plurality of candidate backtracking angle groups.

The target backtracking angle group includes target backtracking angles of the plurality of arrays.

Optionally, in a possible implementation, a mean value and a standard deviation of the adjusted backtracking angles of the plurality of arrays in each of the candidate backtracking angle groups can be determined. Then a dispersion rate of the adjusted backtracking angles of the plurality of arrays in each of the candidate backtracking angle groups is determined according to the mean value and the standard deviation. Further, the target backtracking angle group is determined from the plurality of candidate backtracking angle groups according to the dispersion rate.

Exemplarily, the dispersion rate of the adjusted backtracking angles of the plurality of arrays in each of the candidate backtracking angle groups can be determined according to expression (3):

$$\text{dispersion rate} = \text{standard deviation}/\text{mean value} \tag{3}$$

Taking the above acquired sixteen backtracking angle groups as the candidate backtracking angle groups as an example, the dispersion rate of the candidate backtracking angle group [10.2°, 21.42°, 22.14°, 12.39°] is the smallest, which is 0.321, then this backtracking angle group can be determined as the target backtracking angle group.

In the array backtracking angle adjusting method according to the embodiment of the present disclosure, after acquiring the initial backtracking angle group of the horizontal single-axis tracker, the initial backtracking angle group can be adjusted according to the preset deviation angle to acquire the plurality of adjusted backtracking angle groups (i.e., the candidate backtracking angle groups in this disclosure). Then the target backtracking angle group can be determined from the plurality of candidate backtracking angle groups according to the degree of the dispersion of the adjusted backtracking angles of the plurality of arrays in each of the candidate backtracking angle groups. In this way, a target backtracking angle group with a smaller degree of the dispersion of the adjusted backtracking angles of the plurality of arrays can be determined according to the degree of the dispersion of the adjusted backtracking angles of the plurality of arrays. Since the degree of the dispersion of the adjusted backtracking angles of the plurality of arrays in the target backtracking angle group is relatively small, compared with performing backtracking based on the initial backtracking angle group, performing backtracking based on the target backtracking angle group acquired by the embodiment of the present disclosure can improve the global output power of the entirety of the arrays.

In addition, in view of a phenomenon that the power generation would be affected by the shading existed between arrays in a horizontal single-axis tracking system on the uneven terrain, in the embodiment of the present disclosure, the inter-array relative slope model is constructed by determining in advance the relative slope parameter groups in different time periods. In practical applications, the relative slope parameter group is determined from the inter-array relative slope model according to the current time information, and the initial backtracking angle group is determined according to the relative slope parameter group. Then the initial backtracking angle group is adjusted according to the preset deviation angle to determine the candidate backtracking angle group. Further, the target backtracking angle group is determined from the plurality of candidate backtracking angle groups according to the degree of the dispersion of the adjusted backtracking angles of the plurality of arrays in each of the candidate backtracking angle groups, so as to reduce shading and light leakage, and reduce the MPPT loss of the inverter at the same time, thereby reducing the loss of the power generation. The technical solutions provided by the embodiments of the present disclosure are feasible, highly versatile, and applicable to the horizontal single-axis tracking system for various terrains.

Figure 9:
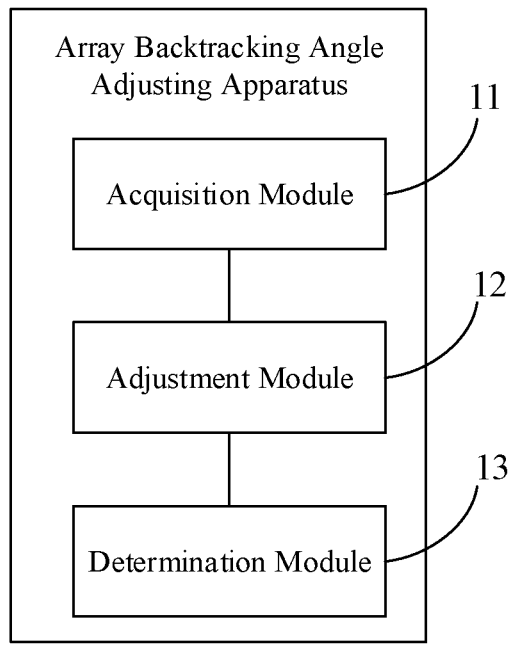
FIG. 9 is a schematic diagram illustrating a structure of an array backtracking angle adjusting apparatus according to an embodiment of the present disclosure.

As shown in FIG. 9, an embodiment of the present disclosure further provides an array backtracking angle adjusting apparatus. The array backtracking angle adjusting apparatus may be the array backtracking angle adjusting apparatus in the array backtracking angle adjusting system involved in FIG. 1 in the above embodiment. The array backtracking angle adjusting apparatus includes: an acquisition module 11, an adjustment module 12 and a determination module 13.

The acquisition module 11 executes the step S201 in the method of the above embodiment, the adjustment module 12 executes the step S202 in the method of the above embodiment, and the determination module 13 executes the step S203 in the method of the above embodiment.

Exemplarily, the acquisition module 11 is configured to acquire an initial backtracking angle group of a horizontal single-axis tracker. The initial backtracking angle group includes initial backtracking angles of a plurality of arrays of the horizontal single-axis tracker. The adjustment module 12 is configured to adjust, according to a preset deviation angle, the initial backtracking angle group to determine candidate backtracking angle groups. Each of the candidate backtracking angle groups includes adjusted backtracking angles of the plurality of arrays. The determination module 13 is configured to determine, according to a degree of dispersion of the adjusted backtracking angles of the plurality of arrays in each of the candidate backtracking angle groups, a target backtracking angle group from the plurality of candidate backtracking angle groups. The target backtracking angle group includes target backtracking angles of each of the arrays.

Optionally, in a possible design, the acquisition module 11 is configured to acquire a relative slope parameter group of the horizontal single-axis tracker, and determine, according to the relative slope parameter group, the initial backtracking angle group of the horizontal single-axis tracker. The relative slope parameter group includes relative slope parameters of each of the arrays of the horizontal single-axis tracker, and the relative slope parameter is configured to represent a relative height difference between two adjacent arrays. Correspondingly, the adjustment module 12 is configured to adjust, under a condition of determining that the relative slope parameters in the relative slope parameter group are all less than or equal to a preset relative slope parameter, and according to the preset deviation angle, the initial backtracking angle group, to determine the plurality of candidate backtracking angle groups.

Optionally, in another possible design, the adjustment module 12 is further configured to: continuously increase the initial backtracking angle of a first row of the arrays in the initial backtracking angle group by the preset deviation angle for F times to acquire F adjusted backtracking angles of the first row of the arrays, and continuously decrease the initial backtracking angle of the first row of the arrays in the initial backtracking angle group by the preset deviation angle for G times to acquire G adjusted backtracking angles of the first row of the arrays; F and G being both positive integers; determine, according to the F adjusted backtracking angles of the first row of the arrays and the relative slope parameter group, F adjusted backtracking angle groups; and determine, according to the G adjusted backtracking angles of the first row of the arrays and the relative slope parameter group, G adjusted backtracking angle groups; and determine the F adjusted backtracking angle groups, the G adjusted backtracking angle groups, and the initial backtracking angle group as the plurality of candidate backtracking angle groups.

Optionally, in another possible design, the determination module 13 is configured to: determine a mean value and a standard deviation of the adjusted backtracking angles of the plurality of arrays in each of the candidate backtracking angle groups; determine, according to the mean value and the standard deviation, a dispersion rate of the adjusted backtracking angles of the plurality of arrays in each of the candidate backtracking angle groups; and determine, according to the dispersion rate, the target backtracking angle group from the plurality of candidate backtracking angle groups.

Optionally, in another possible design, the array backtracking angle adjusting apparatus according to the present disclosure may further include a grouping module.

The grouping module is configured to group, under a condition of determining that there is a relative slope parameter in the relative slope parameter group being greater than the preset relative slope parameter and according to the relative slope parameters of the plurality of arrays, the plurality of arrays into array groups, and determine an initial backtracking angle sub-group corresponding to each of the array groups. The adjustment module 12 is further configured to adjust, in each of the array groups and according to the preset deviation angle, an initial backtracking angle sub-group corresponding to a current array group to determine a plurality of candidate backtracking angle sub-groups. Each of the candidate backtracking angle sub-groups includes adjusted backtracking angles of arrays in the current array group. The determination module 13 is further configured to determine, in each of the array groups and according to the adjusted backtracking angles of the arrays in the current array group, a target backtracking angle sub-group from the plurality of candidate backtracking angle sub-groups. The target backtracking angle sub-group includes target backtracking angles of the arrays in the current array group.

Optionally, in another possible design, the acquisition module 11 is configured to determine the relative slope parameter group according to current time information by calling an inter-array relative slope model. The inter-array relative slope model is calculated according to light incident angles in different historical time periods, an array inclination angle, pitch between the plurality of arrays, a width of each of the arrays, and a shading parameter of each of the arrays.

Optionally, in another possible design, the different historical time periods may include: a morning preset time period in spring, an afternoon preset time period in spring, a morning preset time period in summer, an afternoon preset time period in summer, a morning preset time period in autumn, an afternoon preset time period in autumn, a morning preset time period in winter, and an afternoon preset time period in winter.

Optionally, in another possible design, the determination module 13 is further configured to determine, according to a total length of shadow and a slope of the shadow on a current array, the shading parameter of the current array.

Optionally, in another possible design, the acquisition module 11 is further configured to determine, according to an initial array inclination angle, pitch between the plurality of arrays, a width of each of the arrays, a light incident angle at a current moment, and the relative slope parameter group, the initial backtracking angle group.

Optionally, the array backtracking angle adjusting apparatus may further include a storage module configured to store program codes of this array backtracking angle adjusting apparatus.

Figure 10:
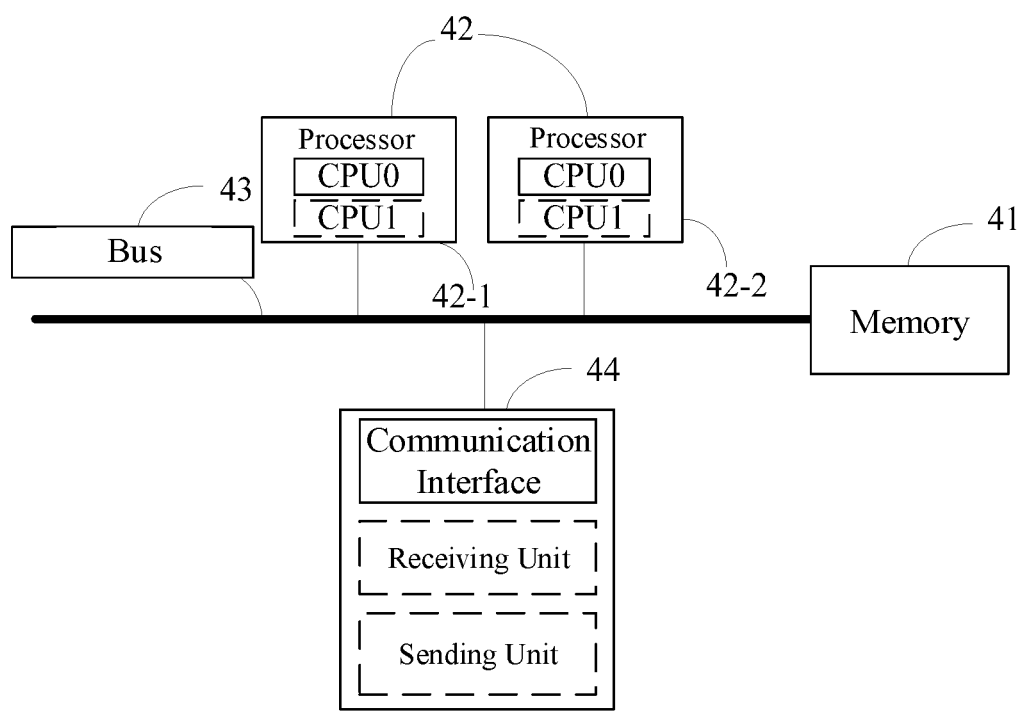
FIG. 10 is a schematic diagram illustrating a structure of another array backtracking angle adjusting apparatus according to an embodiment of the present disclosure.

As shown in FIG. 10, an embodiment of the present disclosure further provides an array backtracking angle adjusting apparatus, including a memory 41, a processor 42 (42-1 and 42-2), a bus 43 and a communication interface 44. The memory 41 is configured to store computer-executable instructions. The processor 42 is connected to the memory 41 through the bus 43. When the array backtracking angle adjusting apparatus is running, the processor 42 executes the computer-executable instructions stored on the memory 41 to cause the array backtracking angle adjusting apparatus to perform the array backtracking angle adjusting method provided by the above embodiments.

Optionally, the array backtracking angle adjusting apparatus may be a physical machine for realizing the adjustment of the array backtracking angle, or may be a part of the physical machine, for example, the apparatus may be a chip system in the physical machine. The chip system is configured to support the array backtracking angle adjusting apparatus to realize the functions involved in the first aspect, for example, receiving, sending or processing the data and/or information involved in the above-mentioned array backtracking angle adjusting method. The chip system includes a chip, and may also include other discrete devices or circuit structures.

In an exemplary implementation, as an embodiment, the processor 42 may include at least one central processing unit (CPU), such as CPU0 and CPU1 shown in FIG. 10. And as an embodiment, the array backtracking angle adjusting apparatus may include a plurality of processors 42, such as the processor 42-1 and the processor 42-2 shown in FIG. 10. Each CPU in these processors 42 may be a single-core processor (single-CPU), or a multi-core processor (multi-CPU). The processor 42 herein may refer to at least one device, circuit, and/or processing core for processing data (e.g., computer-program instructions).

The memory 41 may be a read-only memory (ROM) or other types of static storage devices that can store static information and instructions, or a random-access memory (RAM) or other types of dynamic storage devices that can store information and instructions. The memory 41 may also be an electrically erasable programmable read-only memory (EEPROM), a compact disc read-only memory (CD-ROM) or other CD storage, optical disc storage (including compact disc, laser disc, optical disc, Digital Versatile Disc, Blu-ray Disc, etc.), a magnetic disk storage medium or other magnetic storage device, or any other medium capable of carrying or storing desired program codes in the form of instructions or data structures and accessible by a computer, but is not limited thereto. The memory 41 can exist independently, and is connected to the processor 42 through the bus 43. The memory 41 can also be integrated with the processor 42.

In an exemplary implementation, the memory 41 is configured to store the data in the present disclosure and the computer-executed instructions corresponding to executing software programs of the present disclosure. The processor 42 can run or execute the software programs stored on the memory 41 and invoke the data stored on the memory 41 and various functions of the array backtracking angle adjusting apparatus.

The communication interface 44 is configured to communicate with other devices or communication networks, such as control systems, radio access networks (RAN), wireless local area networks (WLAN), etc., using any device such as a transceiver. The communication interface 44 may include a receiving unit to implement a receiving function, and a sending unit to implement a sending function.

The bus 43 may be an industry standard architecture (ISA) bus, a peripheral component interconnect (PCI) bus or an extended industry standard architecture (EISA) bus, etc. The bus 43 can be divided into an address bus, a data bus, a control bus, and the like. For ease of illustration, only one thick line is used to represent the bus in FIG. 10, but it does not mean that there is only one bus or one type of bus.

As an example, with reference to FIG. 9, the function realized by the acquisition module in the array backtracking angle adjusting apparatus is the same as the function realized by the receiving unit in FIG. 10, the function realized by the adjustment module in the array backtracking angle adjusting apparatus is the same as the function realized by the processor in FIG. 10, and the function realized by the storage module in the array backtracking angle adjusting apparatus is the same as the function realized by the memory in FIG. 10.

The related contents of this embodiment can be explained by reference to the method embodiments described above, and details are not repeated here.

Through the description of the above embodiments, those skilled in the art can clearly understand that for the convenience and brevity of the description, only the division of the above-mentioned functional modules is used as an example for illustration, in practical applications, the above-mentioned functions can be assigned to different functional modules for implementation according to needs, i.e., the internal configuration of the apparatus is divided into different functional modules to implement all or part of the functions described above. For the working process of the above-described system, apparatus, and unit, reference may be made to the corresponding process in the foregoing method embodiments, and details are not repeated here.

An embodiment of the present disclosure also provides a computer-readable storage medium having instructions stored thereon. The computer, when executing the instructions, performs the array backtracking angle adjusting method provided by the above-mentioned embodiments.

The computer-readable storage medium may be, for example, but not limited to, an electrical, magnetic, optical, electromagnetic, infrared, or semiconductor system, apparatus, or device, or any combination thereof. Examples (non-exhaustive list) of the computer-readable storage medium include: an electrically connected and portable computer disk having at least one conductor, a hard disk, a RAM, a ROM, an erasable programmable read only memory (EPROM), a register, a Hard disk, an optical fiber, a CD-ROM, an optical storage device, a magnetic storage device, or any suitable combination of the above, or any other form of the computer-readable storage medium known in the art. An exemplary storage medium is coupled to the processor such the processor can read information from, and write information to, the storage medium. Of course, the storage medium may also be a component of the processor. The processor and the storage medium may be located in an application specific integrated circuit (ASIC). In the embodiments of the present disclosure, the computer-readable storage medium may be any tangible medium containing or storing programs, and the programs may be used by or in combination with an instruction execution system, apparatus or device.

What is claimed is:

1. An array backtracking angle adjusting method, comprising:
acquiring an initial backtracking angle group of a horizontal single-axis tracker; the initial backtracking angle group including initial backtracking angles of a plurality of arrays of the horizontal single-axis tracker;
adjusting, according to a preset deviation angle, the initial backtracking angle group, to determine a plurality of candidate backtracking angle groups; the plurality of candidate backtracking angle groups including adjusted backtracking angles of the plurality of arrays;
determining, according to a degree of dispersion of the adjusted backtracking angles of the plurality of arrays in each of the candidate backtracking angle groups, a target backtracking angle group from the plurality of candidate backtracking angle groups; the target backtracking angle group including target backtracking angles of the plurality of arrays; and
controlling backtracking angles of the plurality of arrays of the horizontal single-axis tracker according to the determined target backtracking angle group.

2. The method of claim 1, wherein the step of acquiring the initial backtracking angle group of the horizontal single-axis tracker includes acquiring a relative slope parameter group of the horizontal single-axis tracker, and determining, according to the relative slope parameter group, the initial backtracking angle group of the horizontal single-axis tracker; the relative slope parameter group including relative slope parameters of the plurality of arrays of the horizontal single-axis tracker, the relative slope parameter being configured to represent a relative height difference between two adjacent arrays; and
the step of adjusting, according to the preset deviation angle, the initial backtracking angle group, to determine the plurality of candidate backtracking angle groups includes adjusting, in response to determining that the relative slope parameters in the relative slope parameter group are all less than or equal to a preset relative slope parameter and according to the preset deviation angle, the initial backtracking angle group, to determine the plurality of candidate backtracking angle groups.

3. The method of claim 2, wherein the step of adjusting, according to the preset deviation angle, the initial backtracking angle group, to determine the plurality of candidate backtracking angle groups includes:
continuously increasing the initial backtracking angle of a first row of the arrays in the initial backtracking angle group by the preset deviation angle for F times to acquire F adjusted backtracking angles of the first row of the arrays; and continuously decreasing the initial backtracking angle of the first row of the arrays in the initial backtracking angle group by the preset deviation angle for G times to acquire G adjusted backtracking angles of the first row of the arrays; F and G being both positive integers;
determining, according to the F adjusted backtracking angles of the first row of the arrays and the relative slope parameter group, F adjusted backtracking angle groups; and determining, according to the G adjusted backtracking angles of the first row of the arrays and the relative slope parameter group, G adjusted backtracking angle groups; and determining the F adjusted backtracking angle groups, the G adjusted backtracking angle groups, and the initial backtracking angle group as the plurality of candidate backtracking angle groups.

4. The method of claim 1, wherein the step of determining, according to the degree of dispersion of the adjusted backtracking angles of the plurality of arrays in each of the candidate backtracking angle groups, the target backtracking angle group from the plurality of candidate backtracking angle groups includes:
determining a mean value and a standard deviation of the adjusted backtracking angles of the plurality of arrays in each of the candidate backtracking angle groups;
determining, according to the mean value and the standard deviation, a dispersion rate of the adjusted backtracking angles of the plurality of arrays in each of the candidate backtracking angle groups; and
determining, according to the dispersion rate, the target backtracking angle group from the plurality of candidate backtracking angle groups.

5. The method of claim 2, further comprising:
grouping, in response to presence of a relative slope parameter in the relative slope parameter group being greater than the preset relative slope parameter and according to the relative slope parameters of the plurality of arrays, the plurality of arrays into array groups, and determining an initial backtracking angle sub-group corresponding to each of the array groups;
adjusting, in each of the array groups and according to the preset deviation angle, an initial backtracking angle sub-group corresponding to a current array group, to determine a plurality of candidate backtracking angle sub-groups; each of the candidate backtracking angle sub-groups including adjusted backtracking angles of arrays in the current array group; and
determining, in each of the array groups and according to the adjusted backtracking angles of the arrays in the current array group, a target backtracking angle sub-group from the plurality of candidate backtracking angle sub-groups; the target backtracking angle sub-group including target backtracking angles of the arrays in the current array group.

6. The method of claim 2, wherein the step of acquiring the relative slope parameter group of the horizontal single-axis tracker includes:
determining, according to current time information by calling an inter-array relative slope model, the relative slope parameter group;
wherein the inter-array relative slope model is calculated according to light incident angles in different time periods, an initial array inclination angle, pitch between the plurality of arrays, a width of each of the arrays, and a shading parameter of each of the arrays.

7. The method of claim 6, wherein the different time periods includes a morning preset time period in spring, an afternoon preset time period in spring, a morning preset time period in summer, an afternoon preset time period in summer, a morning preset time period in autumn, an afternoon preset time period in autumn, a morning preset time period in winter, and an afternoon preset time period in winter.

8. The method of claim 6, further comprising:
before the calling the inter-array relative slope model, determining, according to a total length of shadow and a slope of the shadow on a current array, the shading parameter of the current array.

9. The method of claim 2, wherein the step of determining, according to the relative slope parameter group, the initial backtracking angle group of the horizontal single-axis tracker includes:
determining, according to an initial array inclination angle, pitch between the plurality of arrays, a width of each of the arrays, a light incident angle at a current moment, and the relative slope parameter group, the initial backtracking angle group.

10. An array backtracking angle adjusting apparatus, comprising a memory, a processor, a bus and a communication interface; the memory being configured to store computer-executable instructions, the processor being connected to the memory through the bus;
wherein when the array backtracking angle adjusting apparatus is running, the processor executes the computer-executed instructions stored on the memory to cause the array backtracking angle adjusting apparatus to perform the array backtracking angle adjusting method of claim 1.

11. A computer-readable storage medium, having instructions stored thereon, wherein a computer, when executing the instructions, performs the array backtracking angle adjusting method of claim 1.

12. The method of claim 1, wherein a degree of dispersion of the adjusted backtracking angles of the arrays in the target backtracking angle group is smaller than a degree of dispersion of the initial backtracking angles of the arrays in the initial backtracking angle group.

13. The method of claim 1, wherein the determining, according to the degree of dispersion of the adjusted backtracking angles of the plurality of arrays in each of the candidate backtracking angle groups, the target backtracking angle group from the plurality of candidate backtracking angle groups includes:
selecting, from the plurality of candidate backtracking angle groups, a candidate backtracking angle group of which the adjusted backtracking angles of the plurality of arrays having a smallest degree of dispersion, as the target backtracking angle group.

* * * * *